United States Patent

[11] 3,624,077

| [72] | Inventors | Giangiacomo Nathansohn<br>Milano;<br>Giorgio Winters, Milan, Italy; Emilio<br>Testa, Tessin, Switzerland |
|---|---|---|
| [21] | Appl. No. | 605,217 |
| [22] | Filed | Dec. 28, 1966 |
| [45] | Patented | Nov. 30, 1971 |
| [73] | Assignee | Lepetit S.p.A.<br>Milan, Italy |
| [32] | Priority | Jan. 11, 1966 |
| [33] | | Great Britain |
| [31] | | 1,257/66 |

[54] 1,4-PREGNADIENE-11B-HYDROXY-(17A,16A-D)-2'-ALKYLOXA-ZOLINES
2 Claims, No Drawings

[52] U.S. Cl. .................................................... 260/239.55,
260/999
[51] Int. Cl. .................................................... C07c 173/00

[50] Field of Search ............................................. 260/239.55;
/Machine Searched Steroids

[56] References Cited
UNITED STATES PATENTS

| 2,838,499 | 6/1958 | Spero et al. .................... | 260/239.55 |
| 3,436,389 | 4/1969 | Nathansohn et al. ......... | 260/239.55 |

OTHER REFERENCES

Barton et al., Tetrahedron Letters, No. 43, pp. 3151– 3153 (1964)

Winternitz, et al., Steroids, 1965, pp. 805– 840, pg. 811 relied on or pertinent Primary Examiner—Lewis Gotts
Assistant Examiner—Ethel G. Love
Attorney—Joseph Hirschmann ABSTRACT: The invention relates to 1,4-pregnadiene-11$\beta$-hydroxy-(17$\alpha$,16$\alpha$-d)-2'-alkyloxazolines which have been found to possess antiinflammatory and hormonelike activity.

1,4-PREGNADIENE-11B-HYDROXY-(17A,16A-D)-2'-ALKYLOXA-ZOLINES

This invention is concerned with new steroids and a method for the preparation thereof. More particularly, the compounds with which the invention is concerned are represented by the generic formula

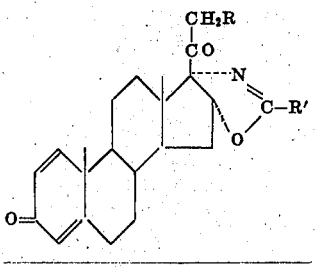

wherein R represents hydrogen, hydroxy or an acyloxy group, R' represents hydrogen, lower alkyl groups or phenyl.

The compounds of this invention possess anti-inflammatory activity which is higher than the one of the analogous, well known compounds generally used in therapy, i.e. prednisolone and hydrocortisone. This superior activity was ascertained in pharmacological tests on animals, which revealed a degree of activity many times superior to that of the parent compounds tested under identical conditions. Moreover, the new steroids show a hormone-like activity as glucocorticoids and mineralocorticoids.

An alternative process for the preparation of compounds of the above formula in which R is acyloxy and R' is methyl is already described in our copending application Ser. No. 538,574 of Mar. 30, 1966, now Pat. No. 3,436,389, dated Apr. 1, 1969, which also claims the compounds per se.

The process for the preparation of the steroido-oxazolines herein described and claimed starts from a pregna-1,4,9(11)-triene-[17α,16α-d]-oxazoline of formula II below, which by treatment with N-bromoacetamide in the presence of perchloric acid in an inert organic solvent gives the 9α-bromo-11β-hydroxy derivative III. This is then debrominated by the action of chromous acetate in a solvent in the presence of a hydrogen atom donor, such as butanethiol.

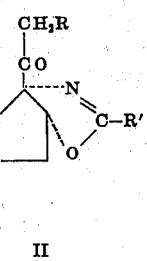

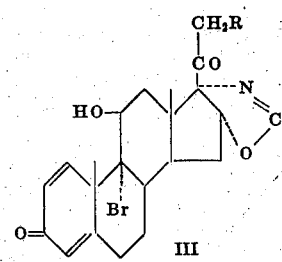

The starting pregna-1,4,9(11)-triene is in turn prepared using as starting compounds the steroids described and claimed in our copending application Ser. No. 538,574 of Mar. 30, 1966, through a series of steps which all are generally used in steroid chemistry. The appended examples, besides giving in detail the process claimed, also describe the steps for the preparation of the starting pregna-1,4,9(11)-trienes.

Generally speaking, these steps comprise the conversion of a 5α-pregnane-3β,11β-diol-20-one-[17α,16α-d]-oxazoline 3β-acylate of formula IV

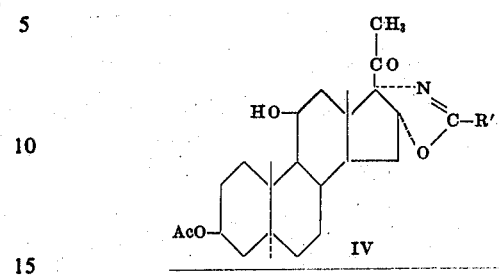

into the desired pregna-1,4,9(11)-triene through the formation of the following intermediate compounds, when the end compound has to bear a 21-hydroxy or 21-acyloxy group:

5α-pregn-9(11)-ene-3β-ol-20-one-[17α,16α-d]-oxazoline 3β-acylate

5α-pregn-9(11)-ene-3β-ol-20-one-[17α,16α-d]-oxazoline

5α-pregn-9(11)-ene- 3β,21-diol-20-one-[17α,16α-d]-oxazoline 21-acylate

5α-pregn-9(11)-ene-21-ol-3,20-dione-[17α,16α-d]-oxazoline 21-acylate pregn-9(11)-ene-2,4-dibromo-21-ol-3,20-dione-[17α,16α-d]-oxazoline 21-acylate pregna-1,4,9(11)-triene-21-ol-3,20-dione-[17α,16α-d]-oxazoline 21-acylate.

It is entirely obvious to all those skilled in the art that when no 21-hydroxy or 21-acyloxy group has to be present in the end compound, some steps of the above indicated preparation are to be omitted. The intermediate compound will then be as follows:

5α-pregn-9(11)-ene-3β-ol-20-one-[17α,16α-d]-oxazoline

5α-pregn-9(11)-ene-3,20-dione-[17α,16α-d]-oxazoline pregn-9(11)-ene-2,4-dibromo-3,20-dione-[17α,16α-d]-oxazoline pregn-1,4,9(11)-triene- 3,20-dione-[17α,16α-d]-oxazoline These preparations of the starting pregna-1,4,9(11)-trienes are given for the purpose of exemplification only, since obvious modifications of the preparation are within the skillfullness of every expert chemist. It is, for instance, possible to introduce the 21-acyloxy group after a 21nonoxygenated pregna-1,4,9(11)-triene- 3,20-dione has been prepared according to the above described procedures. It is in any case apparent that the pregna-1,4,9(11)-trienes are the key intermediates for the preparation of the compounds of the present invention.

The following examples are given for the purpose of illustration only, and are not intended as indicative of the limits of the invention.

EXAMPLE 1

Pregna-1,4-diene-11β,21-diol-3,20-dione-[17α,16α-d]-2'-methyloxazoline 21-acetate To a solution of 2.4 g. of pregna-1,4,9(11)-triene- 21-ol-3,20-dione-[17α, 16α-d]-2'-methyl-oxazoline 21-acetate in 24 ml. of tetrahydrofuran, 12.8 ml. of 0.46 N perchloric acid are added at 15° C. under stirring. N-bromoacetamide (1.1 g.) is then added to the mixture which is kept well far from light, and stirred for 4 hours at room temperature. After lowering the temperature to 10° C. a saturated solution of sodium bisulfite is added in order to decolorize the mixture, which is then poured into 120 ml. of ice water. A product separates, which is collected by filtration, washed with water and then dried, thus obtaining 2.81 g. of crude 9α-bromo-pregna-1,4-diene-11β,21-diol-3,20-dione-[17α,16α-d]-2'-methyl-oxazoline 21-acetate (yield 93 percent), m.p. 175°–176° C.

An amount of 1.1 g. of 9α-bromo-pregna-1,4-diene-11β, 21-diol-3,20-dione-[17α,16α-d]-2'-methyl-oxazoline 21- acetate dissolved in 20 ml. of dimethylsulfoxide are treated for 5 hours under stirring with 5 chemical equivalents of chromous acetate dissolved in 15 ml. of dimethylsulfoxide containing 7 chemical equivalents of butanethiol, under carbon dioxide and at room temperature. The mixture is then poured into 100 ml. of a saturated solution of sodium chloride, and the steroid compound is then extracted with ethyl acetate. The obtained mixture is washed with a solution of sodium bicarbonate, then with water, then it is dried and the solvent is evaporated off to dryness. The residue is chromatographically purified using 20 g. of silicagel and a mixture of benzene (48 percent), chloroform (48 percent) and ethanol (2 percent) as eluting solvent. The residue obtained from this solution is crystallized from acetone-hexane, thus obtaining 0.66 g. of pregna-1,4-diene-11β,21-diol-3,20-dione-[17α,16α-d]-2'-methyl-oxazoline 21-acetate, m.p. 256.5° C; λ max 241–243 μ ($CH_3OH$), $E_{1 cm.}^{1 percent}$ 353.

PREPARATION OF THE STARTING COMPOUND

The starting pregna-1,4,9(11)-triene-21-ol-3,20-dione-[17α,16α-d]-2'-methyl-oxazoline 21-acetate can be prepared through two different ways, which are described hereinafter.

First way

An amount of 22.45 g. of 5α-pregnane- 3α,11β-diol- 20-one-[17α,16α-d]-2'-methyl-oxazoline 3-acetate is dissolved at 60° C. in 131.5 ml. of dimethylformamide and 44 ml. of collidine. The mixture is cooled at 10° C., then 14.60 ml. of methanesulfonic acid chloride and 15.6 ml. of dimethylformamide containing $SO_2$ (5 percent b.w.) are slowly added under stirring. The temperature is allowed to rise to about 35° C., under strong stirring. The temperature is subsequently lowered to 15° C. and 22 ml. of water are dropped into the mixture, which is then poured into 1,500 ml. of ice water, containing 30 g. of sodium acetate. The precipitate is collected on a filter, washed with water and dried. Its weight is 20.64 g. (yield 94 percent), m.p. 153–157° C.

The above obtained product, which is 5α-pregn-9(11)-ene-3β-ol-20-one-[17α,16α-d]-2'-methyl-oxazoline 3-acetate is dissolved (20.5 g.) in 400 ml. of methanol. A solution of 11 g. of KOH in 110 ml. of water is then added under nitrogen. The mixture is refluxed for 10 minutes, then it is cooled to room temperature, and its pH is adjusted to 7–8 with 10 percent acetic acid. The solvent is evaporated in vacuo, and the precipitate collected on a filter, washed, dried and recrystallized from ethyl acetate: 14.2 g. (yield 80 percent), m.p. 212–214°C. This product is 5α-pregn-9(11)-ene-3β-ol-20-one-[17α,16α-d]-2'-methyl-oxazoline. Said compound (10.53 g.) is dissolved in 79 ml. of anhydrous tetrahydrofuran and 79 ml. of methanol. Calcium oxide finely powdered (16 g.) and α,α'-azo-bis-isobutyronitrile (0.52 g.) are then added; the reaction is started at 25° C. after about half an hour using few drops of a solution of 10.53 g. of iodine in 52 ml. of anhydrous tetrahydrofuran and 32 ml. of methanol. The mixture is then cooled to 5°–10° C. and is made to absorb the remaining iodine solution under strong stirring. After 2 hours no more free iodine is present and the solution is still clear. The solvent is evaporated in vacuo at 25° C. and the residue is extracted several times with methylene chloride; the obtained solution is washed with aqueous 2 percent sodium thiosulfate, then with water. The solvent is evaporated to dryness at room temperature and the crude compound is then dissolved in 58 ml. of acetone; this solution is added to a stirred mixture containing 96 ml. of triethylamine, 96 ml. of acetone and 58.2 ml. of glacial acetic acid. After one hour acetone is evaporated in vacuo and the product is precipitated using 800 ml. of water. The crude product is crystallized from ethanol and weighs 9.04 g. (yield 74 percent); it is 5α-pregn-9(11)-ene-3β,21-diol-20-one-[17α,16α-d]-2'-methyl-oxazoline 21-acetate, m.p. 258°–261°C.

One gram of the above compound, suspended in 50 ml. of stabilized acetone, is oxidized at room temperature with about 0.7 ml. of 8 N chromic acid. At the end the mixture is diluted with 50 ml. of water and the acetone is evaporated in vacuo. The precipitate is filtered, washed with water, dried. The product is crystallized from ethanol. Yield 0.9 g. (90 percent); m.p. 205°–210° C. It is 5α-pregna-9(11)-ene--ene-21-ol-3,20-dione-[17α,16α-d]-2'-methyl-oxazoline 21-acetate.

Eight grams of the above compound are dissolved in 120 ml. of anhydrous dioxane and treated at 15° C. with few drops of a solution of 6.1 g. of bromine in 60 ml. of anhydrous dioxane. The reaction is started with 8 ml. of a solution containing 31 percent by weight of anhydrous hydrobromic acid in glacial acetic acid. At the end of said addition the solution is allowed to stand for 20 minutes at 20° C. then it is poured into 1,500 ml. of ice water containing 40 g. of potassium acetate. After 30 minutes the mixture is filtered, washed and dried at 40° C.: 10.3 g. of crude 2,4-dibromo-derivative are thus obtained, which are dissolved in 133 ml. of anhydrous dimethylformamide under nitrogen. An amount of 3.25 of anhydrous lithium bromide and 6.53 g. of anhydrous lithium carbonate are added and the mixture is heated at 130° C. for 5 hours under stirring; then it is cooled and poured in 1,000 ml. of ice water. The product is extracted with chloroform, washed with water, dried and the solvent is distilled off in vacuo. The residue is acetylated at room temperature for 15 hours using 6 ml. of acetic anhydride in 20 ml. of pyridine. The mixture is poured into 150 ml. of ice water containing 15 ml. of concentrated hydrochloric acid, the product is collected, washed and dried; then it is dissolved in benzene and this solution is purified through a column of silicagel and using benzene with 1 percent b.w. of ethanol as eluting solvent. From the resulting solution 4 g. (yield 50 percent) of pregna- 1,4,9(11)-triene-21-ol-3,20-dione-[17α,16α-d]-2'-methyl-oxazoline 11-acetate are obtained; m.p. 197°–198° C.

Second way

An amount of 4 g. of 11β-hydroxy-pregna-1,4-diene-3,20-dione-[17α, 16α-d]-2'-methyl-oxazoline is dissolved in 23 ml. of dimethylformamide and 7.5 ml. of collidine. Then 2.5 ml. of methanesulfonic acid chloride are dropped into the stirred mixture, previously cooled to 10° C. Two and one half milliliters of dimethylformamide containing $SO_2$ (5 percent b.w.) are added dropwise at the same temperature, then the solution is warmed to 20° C. The temperature is maintained at 30°–33° C. After ten minutes the temperature is lowered and maintained between 10 ° and 20° C. and 4.5 ml. of water are added dropwise. The mixture is then poured into 250 ml. of ice water containing 5 g. of sodium acetate. The product is extracted with methylene chloride, this solution is dehydrated and the solvent is distilled off. The residue is pregna-1,4,9(11)-triene-3,20-[17α,16α-d]-2'-methyl-oxazoline, yield 2.77 g. (71 percent), m.p. 249°–252°C. The above compound (3.3 g.) is dissolved in 24.8 ml. of anhydrous tetrahydrofuran and 24.8 ml. of methanol. To this mixture 5 g. of calcium oxide and 0.160 g. of α,α'-azo-bis-isobutyronitrile are added under strong stirring. At the temperature of 25° C. some drops of a solution containing 3.3 g. of iodine dissolved in a mixture of 16 ml. of tetrahydrofuran and 10 ml. of methanol are added. After about half an hour the reaction starts and iodine is absorbed: then the remaining iodine solution is added dropwise at 10° C. Fifteen minutes after the end of the addition 200 ml. of methylene chloride are added, the mixture is filtered and the residue is well washed with methylene chloride on the filter. The filtrate is washed with a very cold 2 percent solution sodium thiosulfate in water, then with water. The solution is dried and the solvent is distilled off. The obtained solid residue is dissolved in acetone (19 ml.), then this solution is added to a warm (50° C.) and stirred mixture prepared by adding after cooling 18.3 ml. of glacial acetic acid to a mixture of 30 ml. of acetone in 30 ml. of triethylamine. This solution is boiled for half an hour, then the organic solvents are evaporated in vacuo, and the residue is taken up with 100 ml. of water. The crude product is crystallized from methanol yielding 2.5 g. of pregna-1,4,9(11)-triene-21-ol-3,20-dione-[17α,16α-d]-2'-methyl-oxazoline 21-acetate.

Example 2

Pregna-1,4-diene-11β,21-diol-3,20-dione-[17α,16α-d]-2'-phenyloxazoline 21-acetate To a solution of 1.17 g. of pregna-1,4,9(11)-triene-21-ol-3,20-dione-[17α,16α-d]-2'-phenoxazoline 21-acetate in 10.2 ml. of tetrahydrofuran 5.45 ml. of 0.46 N perchloric acid are added followed by 0.467 g. of N-bromoacetamide in the dark. After stirring for 4 hours at 15° C. the solvent is removed in vacuo. Yield 1.48 g. of crude pregna-1,4-diene-9α-bromo-11β,21-diol-3,20-dione-[17α,16α-d]-2'-phenyloxazoline 21-acetate, m.p. 168°–175° C.

To the above crude product (1.16 g.) dissolved in 25 ml. of dimethylsulfoxide, 3 equivalent amounts of chromous acetate in 20 ml. of dimethylsulfoxide and 5 equivalents amounts of butanethiol are added under a $CO_2$ atmosphere. After stirring for 3 hours at 10°–15° C. the mixture is poured into 200 ml. of saturated aqueous NaCl solution at 0° C. and extracted with ethyl acetate. The organic layer is washed with aqueous sodium bicarbonate solution and with water, dried over anhydrous sodium sulfate and evaporated to dryness. Yield 1.3 g. of crude pregna-1,4-diene-11β,21-diol-3,20-dione-[17α,16α-d]-2'phenyloxazoline 21-acetate, which is purified by chromatography through silicagel. The product has m.p. 130°–135° C., $[α]_D^{20}$ –32.2°(c.0.5, $CHCl_3$), λ max 242 μ ($CH_3OH$), $E_{1\ cm.}^{1\ percent}$ 450.

PREPARATION OF THE STARTING COMPOUND 1) 5α-Pregnane-3β,11β-diol-20-one-[17α,16α-d]-2'-phenyloxazoline 3-benzoate.

To an amount of 51 g. of 5α-pregnane-3α-ol-11,20-dione-[17α,16α]-2'-phenyloxazoline 3-benzoate dissolved in a mixture of 1240 ml. of methanol and 200 ml. of chloroform, a solution of 29.7 g. of semicarbazide hydrochloride in 178 ml. of water and 20 ml. of pyridine is added at 60° C. The solution is refluxed for 5 hours, then the solvent is evaporated under reduced pressure until the volume has reached 300 ml. Ice water is added (1 liter), and the formed precipitate is recovered, washed with water and dried. The 20-semicarbazone thus obtained melts at 220°–225° C. and weighs 57 g. An amount of 11.05 g. of the above product are dissolved in 206 ml. of ethanol and treated with 32 ml. of 10 percent solution of sodium bicarbonate in water at 60°–70° C. under a nitrogen stream. Sodium borohydride (2.09 g.) is then added in small amounts, and the mixture is refluxed for half an hour after the end of the addition. Another amount (2.09 g.) is added, and then the solution is refluxed for 90 minutes. The temperature is allowed to go down to 10° C., the solution is neutralized with 10 percent acetic acid, the solvent is removed in vacuo and to the thus obtained suspension 200 ml. of water are added. The precipitate is the 11β-hydroxy-20-semicarbazone derivative, of which 11.05 g. are collected, m.p. 275°–285° C. A quantity of 11 g. of this product dissolved in 100 ml. of methanol is refluxed with 10 percent hydrochloric acid for one hour. The solvent is removed under reduced pressure and neutralized after cooling, with 10 percent sodium hydroxide. The precipitate is collected on filter, washed and dried: 28.53 g. of 5α-pregnane-3β,11β-diol-20-one-[17α,16α-d]-2'-phenyloxazoline 3-benzoate are obtained, m.p. 203°–205° C., $[α]_D$+26.3°(c. 0.5 percent, $CHCl_3$).

2) 5α-Pregn-a(11)-ene-3β-ol-20-one-[17α,16α-d]-2'-phenyloxazoline 3-benzoate.

A solution of 43 g. of 5α-pregnane-3β,11β-diol-20-one-[17α,16-d]-2'-phenyloxazoline 3-benzoate in 290 ml. of dimethylformamide and 96.7 ml. of collidine is cooled to 10° C., then 25 ml. of methanesulfonic acid chloride and 32 ml. of dimethylformamide containing 6 percent b.w. of $SO_2$ are slowly added under strong stirring. The temperature is allowed to go up to 32°–34° C. for 10 minutes, then it is again lowered and 45 ml. of water are slowly added. The reaction mixture is poured under stirring in 3200 ml. of water at 80° C.; after cooling the precipitate is collected on a filter and washed with water. 36 grams of 9(11)-pregnene are obtained, m.p. 115°–120° C.

3) 5α-Pregn-9(11)-ene-3β-ol-20-one-[17α,16α-d]-2'-phenyloxazoline.

An amount of 35 g. of 5α-pregn-9(11)-ene-3β-ol-20-one-[17α,16α-d]-2'-phenyloxazoline 3-benzoate are dissolved at the boiling temperature in a mixture of 700 ml. of methanol, 100 ml. of water and 20 g. of potassium hydroxide. After 60 minutes the solvent is removed and the solution is neutralized with dilute acetic acid. The obtained precipitate (28 g.) has m.p. 150°–155° C.

4) 5α-Pregn-9(11)-ene-3β,21-diol-20-one-[17α,16α-d]-2'-phenyloxazoline 21-acetate.

An amount of 17.24 g. of 5α-pregn-9(11)-ene-3β-ol-20-one-[17α,16α-d]-2'-phenyloxazoline is dissolved in 700 ml. of chloroform and is treated with 34.5 ml. of 24 percent hydrobromic acid dissolved in acetic acid. To this mixture 6.36 g. of bromine dissolved in 70 ml. of chloroform are added through 40 minutes under stirring at 20° C. After adding bromine the mixture is allowed to stand for 10 minutes, then it is washed with a cold solution of sodium bicarbonate until a neutral pH is reached, dried over sodium sulfate and the solvent is distilled off, thus obtaining a residue weighting 20.96 g. This product is dissolved in 509 ml. of acetone and heated to boiling temperature under strong stirring while a solution of 36.19 g. of potassium acetate in 36.19 ml. of water is added together with a very small quantity of iodine. The mixture is refluxed for 6 hours. The previously added acetone is then eliminated in vacuo and 500 ml. of water are added. A product crystallizes out and is recovered by filtration: it weighs 16.33 g. It is the 21-ol-21-acetate derivative, m.p. 132°–134° C., $[α]_D$–17.4° (c., 0.5 percent, $CHCl_3$), $E_{1\ cm.}^{1\ percent}$ 261 per λ max 248–250 μ (in methanol).

This same compound can be obtained also through the 21-iododerivative and subsequent reaction of same with glacial acetic acid.

5) 5α-Pregn-9(11)-ene21-ol-3,20-dione-[17α, 16α-d]-2'-phenyloxazoline 21-acetate.

To a solution of 9.4 g. of 5α-pregn-9(11)-ene-3β, 21-diol-20-one-[17α, 16α-d]-2'-phenyloxazoline 21-acetate in 300 ml. of acetone about 6 ml. of 8 N chromic aid are added dropwise under strong stirring. The final suspension is diluted with ice-water and the organic solvent is evaporated in vacuo. By filtration 8.4 g. of the 3-oxo-derivative are obtained, m.p. 115°–120° C.

6) Pregna-1,4,9(11)-triene-21-ol-3,20-dione-[17α, 16α-d]-2'phenyloxazoline 21-acetate.

A solution of 25 percent hydrobromic acid in acetic acid and then (through 2 hours) 6.28 g. of bromine dissolved in 60 ml. of dioxan are added under stirring and at room temperature, to a solution of 9.35 g. of 5α-pregn-9(11)-ene-21-ol-3,20-dione-[17α, 16α-d]-2'-phenyloxazoline 21-acetate in dioxane. After half an hour the mixture is poured into another solution of 50 g. of potassium acetate in 2000 ml. of ice-water. The precipitate is collected, washed and dried, then it is dissolved in 130 ml. of dimethylformamide, and after heating at 130° C. 3.13 g. of lithium bromide and 6.28 g. of lithium carbonate are added under stirring in a nitrogen stream. After 3 hours the mixture is poured in ice-water, and extracted with ethyl acetate. The obtained solution is washed with water, then the solvent is evaporated to dryness. The residue is chromatographically purified using silicagel (100 g.) and benzene-ethyl acetate (95:5) as eluting solvent. The residue obtained by evaporation of the solvent is further purified by crystallization from ligroin. It weighs 5 g., m.p. 191°–194°C., $[α]_D$–98.1(c. 0.51 percent, $CHCl_3$), $E_{1\ cm.}^{1\ percent}$ 561.5 per λ max 240–242 μ (in methanol).

EXAMPLE 3

Pregna-1,4-diene-11β, 21-diol-3,20-dione-[17α, 16α-d]-2'-butyloxazoline 21-acetate.

A solution of 4.74 g. of pregna-1,4,9(11)-triene-21-ol-3,20-dione-[17α, 16α-d]-2'-butyloxazoline 21-acetate in 44 ml. of tetrahydrofuran is reacted at 15° C. under stirring with 23 ml. of 0.46 N perchloric acid. The mixture is kept out of light and 1.97 g. of N-bromoacetamide are added at 10°–15° C. After 1 hour the excess N-bromoacetamide is destroyed by the addition of sodium bisulfite, the organic solvent is evaporated in vacuo and the precipitate is washed with cold water. The obtained product weights 5.7 g., m.p. 155°–158° C.

An amount of 9α-bromo-pregna-1,4-diene-11β, 21-diol-3,20-dione-[17α, 16α-d]-2'-butyloxazoline 21-acetate prepared as described above (1.2 g.) is dissolved in 20 ml. of dimethylsulfoxide and is treated under carbon dioxide with 3 equivalent amounts of chromous acetate contained in 15 ml. of dimethylsulfoxide and 5 equivalent amounts of butanethiol. The mixture is stirred for 3 hours at 10°–15° C., it is poured into 100 ml. of a very cold solution of sodium chloride and then an extraction is made with ethyl acetate. The obtained solution is washed with sodium bicarbonate and water, then it is evaporated to dryness. The residue is chromatographically purified on 12 g. of silicagel using the mixture benzene:ethyl acetate (9:1) as the eluting solvent. An amount of 0.45 g. of 11β-hydroxy derivative is obtained, $[α]_D$+40.6 (c. 0.5 percent, $CHCl_3$).

PREPARATION OF THE STARTING COMPOUND 1) 5α-Pregane-3β, 11β-diol-20-one-[17α, 16α-d]-2'[17α,-butyloxazoline.

An amount of 115 g. of 5 α-pregnane-3β-ol-11,20-dione-[17α,16α-d]-2'-butyloxazoline 3-valerate is dissolved in methanol and the solution is heated to boiling temperature; 540 ml. of water, 62.2 ml. of pyridine and 88 g. of semicarbazide hydrochloride are then added. The mixture is refluxed for 5 hours, then, after evaporation of methanol, it is poured into 3500 ml. of water. A precipitate is formed: it is the 20-semicarbazide derivative, which weighs 117 g. and has m.p. 229°–232° C., $[α]_D$+43.2 (c. 0.5 percent, $CHCl_3$). Sixty grams of the above compound dissolved in 1200 ml. of ethanol are heated at 60°–70°C. and to this solution another solution of 18.8 g. of $KHCO_3$ in 18.8 ml. of water is added under a nitrogen stream. Then 14.4 g. of sodium borohydride are carefully added to the boiling mixture. After boiling for 90 minutes the mixture is cooled and its pH is made neutral with 10 percent acetic acid. Ethanol is distilled off, water is added and an extraction is carried out with chloroform. The product is scarcely soluble in chloroform, so that at last it crystallizes out; weight 58 g., m.p. 235°–238° C. It is the 11β-hydroxy-derivative. A solution of this product (22 g.) in 220 ml. of methanol and 220 ml. of 10 percent sodium hydrochloric acid is refluxed for 90 minutes. Ethanol is then distilled off and the resulting solution is cooled and made alkaline with 10 percent sodium hydroxide. An amount of 21 g. of 5α-pregnane-3β, 11β-diol-20-one-[17α,16α-d]-2'-butyloxazoline is obtained, m.p. 120°–125° C.

2) 5α-Pregnane-3β, 11β-diol-20-one-[17α,16α-d]-2'-butyloxazoline 3-acetate.

A mixture os 28.2 g. of 5α-pregnane-3β,11β-diol-20-one-[17α,16α-d]-2'-butyloxazoline, 100 ml. of pyridine and 28.2 ml. of acetic anhydride is heated on a water bath for 45 minutes. The mixture is then poured into ice-water containing 100 ml. of concentrated hydrochloric acid. A precipitate is formed, which is repeatedly washed with water and dried. The aqueous solution is chromatographically purified using silicagel and benzene containing 5 percent of acetone as eluting solvent. By evaporation of the solvent another amount of product is obtained: total yield 22 g., m.p. 143°–145° C., $[α]_D$+60.6 (c. 0.5 percent, $CHCl_3$).

3) 5α-Pregn-9(11)-ene3β-ol-20-one-[17α,16α-d]-2'-butyloxazoline 3-acetate.

An amount of 17.34 g. of 5α-pregnane-3β,11β-diol-20-one-[17α,16α-d]-2'butyloxazoline 3-acetate is dissolved in 93.2 ml. of dimethylformamide and 30.9 ml. of collidine. To this solution are added 10.45 ml. of methanesulphonic acid chloride at a temperature of 10° C., then 8.4 ml. of dimethylformamide containing $SO_2$ (6% b.w.). The temperature is now allowed to rise up to 35° C., the mixture is stirred for 10 minutes, then it is cooled and poured into 1000 ml. of ice-water containing 10 g. of sodium acetate. An extraction is made with $CHCl_3$ and the obtained solution is dried over sodium sulfate, it is filtered and the solvent is removed. The oily product thus obtained weights 17.79 g. and is 5α-pregn-9(11)-ene-3β-ol-20-one-[17α,16α-d]-2'-butyloxazoline 3 acetate.

4) 5α-Pregn-9(11)-ene-3β-ol-20-one-[17α,16α-d]-2'-butyloxazoline.

An amount of 17.79 g. of 5α-pregn-9(11)-ene-3β-ol-20-one-[17α,16α-d]-2'-butyloxazoline 3-acetate dissolved in 300 ml. of methanol are heated to reflux, then a solution of 4.86 g. of KOH in 80 ml. of water is added. The mixture is allowed to boil for 10 minutes, then the organic solvent is distilled off and the resulting solution is neutralized with $CH_3COOH$. After extraction with chloroform and evaporation of the solvent the residue is taken up with ethanol and precipitated by diluting with water. Yield 14 g., m.p. 90°–93° C., $[α]_D$+48.6 (c., 0.5 percent, $CHCl_3$).

5) 5α-Pregn-9(11)-ene-3β,21-diol-20-one-[17α,16α-d]-2'-butyloxazoline 21-acetate.

To a quantity of 9.74 g. of 5α-pregn-9(11)-ene-3β-ol-20-one-[17α, 16α-d]-2'-butyloxazoline dissolved in 290 ml. of chloroform, 19.5 ml. of a solution of 24 percent hydrobromic acid in acetic acid and 4.15 g. of bromine in 39 ml. of $CHCl_3$ are added. The mixture is then made neutral with sodium bicarbonate, the chloroform layer is separated to dryness in vacuo. The residue is the 21-bromo-derivative, and it is dissolved in 48 ml. of acetone which is added to a boiling solution of the following composition: triethylamine 79.5 ml., acetone 79.5 ml., glacial acetic acid 48 ml. After 1 hour's refluxing the organic solvent is removed in vacuo and 200 ml. of water are added. The product is extracted with chloroform and crystallized from isopropyl-ether: it is the 21-acetate, weight 7.79 g., m.p. 176°–179° C., $[α]_D$+10.7 (c. 0.5 percent, $CHCl_3$).

6) 5α-Pregn-9(11)-ene-21-ol-3,20-dione-[17α,16α-d]-2'-butyloxzaoline 21-acetate.

A solution of 30 g. of 5α-pregn-9(11)-ene3β,21-diol-20-one-[17α,16α-d]-2'-butyloxazoline 21-acetate in 1300 ml. of acetone is oxidized at room temperature by a volume of 20 ml. of a solution of 8 N chromic acid in sulfuric acid. The mixture is then diluted with 1500 ml. of ice-water, and almost all the organic solvent is evaporated off. An extraction with chloroform, which is subsequently removed, yields a product which is taken up with diethyl ether. By evaporating the solvent 16.65 g. of the 3-oxo-derivative are obtained, m.p. 170°–174° C., $[α]_D$+27.2 (c. 0.5 percent, $CHCl_3$).

7) Pregna-1,4,9(11)-triene-21-ol-3,20-dione-[17α,16α-d]-2'-butyloxazoline 21-acetate.

A solution of 8.36 g. of 5α-pregn-9(11)-ene-21-ol-3,20-dione-[17α16α-d]-2'-butyloxazoline 21-acetate in 110 ml. of dioxane, containing 8.36 ml. of a solution of 24 percent hydrobromic acid in acetic acid, is reacted within 60 minutes with 5.68 g. of bromine dissolved in 57 ml. of acetic acid. The mixture is allowed to stand for 45 minutes, then it is poured into 1000 ml. of water containing potassium acetate (35 g.), and filtered, thus obtaining 10.7 g. of 2,4-dibromoderivative. This compound is dissolved in 42 ml. of dimethylformamide, and added to a suspension of 3.15 g. of lithium bromide and 6.36 g. of lithium carbonate in 87 ml. of dimethylformamide, stirred and heated to 130° C. under nitrogen stream for 4 hours, then it is cooled and poured into ice-water. An extraction with chloroform yields the required compound which is recrystallized from acetone-hexane; its weight is 8 g., m.p. 127°–131° C.; $[α]_D$−37.9 (c. 0.5 percent, $CHCl_3$).

EXAMPLE 4

Pregna-1,4-diene-11β-ol-3,20-dione-[17α,16α-d]-2'methyloxazoline

To a solution of 6 g. of pregna-1,4(11)-triene-3,20-dione-[17α,16-d]-2'-methyloxazoline in 70 ml. of tetrahydrofuran, 37.5 ml. of 0.46 N HClO₄ are added at 10°–15° C. The reaction vessel is kept out of light and 3.21 g. of N-bromoacetamide are added. The mixture is stirred for 1 hour at 10°–15° C., it is decolored with a saturated solution of sodium bisulfite, the organic solvent is removed in vacuo. The residue is taken up with ice-water (50 ml.) and the 9α-bromo-11β-hydroxy derivative is isolated by filtration (7.5 g.); m.p. 175°–178° C.

An amount of 4.1 g. of 9α-bromo-11β-hydroxy-pregna-1,4-diene-9α-bromo-11β-ol-3,20-dione-[17α,16α-d]-2'-methyloxazoline is dissolved in 50 ml. of dimethylsulfoxide are treated at 10° C. and under carbon dioxide with 3 equivalent amounts of chromous acetate contained in 50 ml. of dimethylsulfoxide and 5 equivalent amounts of butanethiol. The mixture is stirred for 150 minutes at 20° C., it is poured into a very cold aqueous solution of sodium chloride and an extraction is made with ethyl acetate. The obtained solution is washed with solutions of sodium bicarbonate and sodium chloride, it is dried over sodium sulfate and then it is evaporated to dryness. The residue is recrystallized from methanol and yields 2.1 g. (63 percent) of pregna-1,4-diene-11β-ol-3,20-dione-[17α,16α-d]-2'-methyloxazoline, m.p. 277°–279° C., $[\alpha]_D$+97.3 (CHCl₃).

PREPARATION OF THE STARTING COMPOUND

To a solution of 50 g. of 5α-pregn-9(11)-ene-3β-ol-20-one-[17α,16α-d]-2'-methyloxazoline prepared as indicated in example 1, 1500 ml. of acetone a 8 N solution of chromic acid sufficient to oxidize the 3β-hydroxy group is added dropwise, at room temperature and under strong stirring. By evaporating the organic solvent and adding water 44 g. of the 3-keto compound are recovered, yield 88 percent, m.p. 205°–207° C., $[\alpha]_D$+74.7 (CHCl₃). An amount of 10 g. of the above prepared 5α-pregn-9(11)-ene-3,20-dione-[17α,16α-d]-2'-methyloxazoline dissolved in a mixture obtained by mixing 180 ml. of dioxane and 10 ml. of 25 percent hydrobromic acid in acetic acid, is treated for 45 minutes with a solution of 8.8 g. of bromine dissolved in 80 ml. of dioxane, at room temperature. After half an hour the mixture is poured into another solution of 50 g. of potassium acetate in 2000 ml. of ice-water, an amount of 14 g. of 2,4-dibromo-derivative is obtained, which is subsequently dissolved in 180 ml. of dimethylformamide. To the obtained solution 4.5 g. of lithium bromide and 8.5 g. of lithium carbonate are added, the mixture is heated at 135° C. for 4 hours, then it is poured in ice-water; the obtained solution is extracted several times with ethyl acetate. By evaporating the solvent 9.4 g. of the corresponding 1,4,9(11)-pregnatriene are obtained; it can be chromatographically purified on column by using 75 g. of silicagel and a mixture benzene-ethyl acetate as eluting solvent. The product is then recrystallized from methanol; it weighs 6.1 g. (yield 60 percent), m.p. 250°–253° C., $[\alpha]_D$–10.6 (CHCl₃), $E_{1\ cm.}^{1\ percent}$ 4.22 at λ max 238–240 μ.

EXAMPLE 5

Pregna-1,4-diene-11β,21-diol-3,20-dione-[17α,16α-d]-oxazoline 21-acetate

Prepared as described in the preceding examples. It has m.p. 260°–264° C., $[\alpha]_D^{20}$+75°(c. 0.5 CHCl₃), $E_{1\ cm.}^{1\ percent}$ 365, λ max 240–242.

The starting pregna-1,4,9,-triene-21-ol-3,20-dione-[17α,16α-d]-oxazoline 21-acetate has m.p. 253°–255° C., $[\alpha]_D^{20}$0° (c 0.5, CHCl₃), $E_{1\ cm.}^{1\ percent}$ 380.6, λ max 238–240. The intermediate 9α-bromo-11β-hydroxy steroid has m.p. 158°–160° C.

We claim:
1. Pregna-1,4-diene-11β,21-diol-3,20-dione-[17α,16α-d]-2'-phenyloxazoline 21-acetate.
2. A steroido-oxazoline of the formula

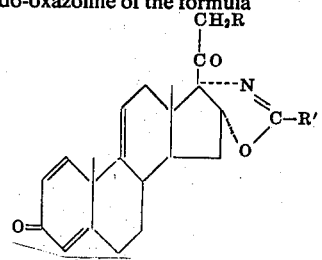

wherein R is a member of the class consisting of hydrogen, hydroxy and acyloxy, R' is a member of the class consisting of hydrogen, lower alkyl and phenyl.

* * * * *